(12) United States Patent
Kou et al.

(10) Patent No.: US 12,399,750 B2
(45) Date of Patent: Aug. 26, 2025

(54) SYSTEM ON CHIP PARALLEL COMPUTING OF ML SERVICES AND APPLICATIONS FOR PARTITIONING RESOURCES BASED ON THE INFERENCE TIMES

(71) Applicants: Baidu USA LLC, Sunnyvale, CA (US); Baidu.com Times Technology (Beijing) Co., Ltd., Beijing (CN)

(72) Inventors: Haofeng Kou, Sunnyvale, CA (US); Davy Huang, Sunnyvale, CA (US); Manjiang Zhang, Sunnyvale, CA (US); Xing Li, Sunnyvale, CA (US); Lei Wang, Beijing (CN); Huimeng Zheng, Beijing (CN); Zhen Chen, Beijing (CN); Ruichang Cheng, Beijing (CN)

(73) Assignees: BAIDU USA LLC, Sunnyvale, CA (US); BAIDU.COM TIMES TECHNOLOGY (BEIJING) CO., LTD., Ca Beijing (CN)

( * ) Notice: Subject to any disclaimer, the term of this patent is extended or adjusted under 35 U.S.C. 154(b) by 0 days.

(21) Appl. No.: 17/799,681

(22) PCT Filed: Jun. 10, 2022

(86) PCT No.: PCT/CN2022/098126
§ 371 (c)(1),
(2) Date: Aug. 14, 2022

(87) PCT Pub. No.: WO2023/236187
PCT Pub. Date: Dec. 14, 2023

(65) Prior Publication Data
US 2024/0193002 A1 Jun. 13, 2024

(51) Int. Cl.
*G06F 9/50* (2006.01)
*G06F 9/54* (2006.01)
(Continued)

(52) U.S. Cl.
CPC .......... *G06F 9/5066* (2013.01); *G06F 9/5016* (2013.01); *G06F 9/5044* (2013.01);
(Continued)

(58) Field of Classification Search
None
See application file for complete search history.

(56) References Cited

U.S. PATENT DOCUMENTS 11,341,339 B1* 5/2022 Li .......................... G06F 40/40
12,014,748 B1* 6/2024 Giri ...................... G10L 21/034
(Continued)

*Primary Examiner* — Abu Zar Ghaffari
(74) *Attorney, Agent, or Firm* — WOMBLE BOND DICKINSON (US) LLP

(57) ABSTRACT

A system obtains a performance profile corresponding to times taken to perform an inferencing by a machine learning (ML) model using a different number of processing resources from a plurality of processing resources. The system determines one or more groupings of processing resources from the plurality of processing resources, each grouping includes one or more partitions. The system calculates performance speeds corresponding to each grouping based on the performance profile. The system determines a grouping having a best performance speed from the calculated performance speeds. The system partitions the processing resources based on the determined grouping to perform the inferencing.

14 Claims, 6 Drawing Sheets

(51) Int. Cl.
   *G06N 3/0442*    (2023.01)
   *G06N 3/0464*    (2023.01)
   *G06N 3/08*      (2023.01)
   *G06N 5/04*      (2023.01)
   *G06N 20/10*     (2019.01)
   *G06N 20/20*     (2019.01)

(52) U.S. Cl.
   CPC ............ *G06F 9/5061* (2013.01); *G06F 9/544* (2013.01); *G06N 3/0442* (2023.01); *G06N 3/0464* (2023.01); *G06N 3/08* (2013.01); *G06N 5/04* (2013.01); *G06N 20/10* (2019.01); *G06N 20/20* (2019.01); *G06F 2209/5017* (2013.01); *G06F 2209/503* (2013.01)

(56) References Cited

U.S. PATENT DOCUMENTS

| | | | | |
|---|---|---|---|---|
| 2014/0373025 | A1* | 12/2014 | Kim | G06F 9/505 |
| | | | | 718/104 |
| 2015/0317189 | A1* | 11/2015 | Georgescu | G06F 9/50 |
| | | | | 718/104 |
| 2016/0055612 | A1* | 2/2016 | Barik | G06F 3/14 |
| | | | | 345/522 |
| 2017/0116552 | A1* | 4/2017 | Deodhar | G06Q 10/0639 |
| 2020/0319988 | A1* | 10/2020 | Baxter | G06F 11/3433 |
| 2021/0044535 | A1* | 2/2021 | Ignatyev | H04L 47/83 |
| 2021/0112116 | A1* | 4/2021 | Baccour | H04N 21/262 |
| 2022/0051093 | A1* | 2/2022 | Skaljak | G06T 15/06 |
| 2022/0121916 | A1* | 4/2022 | Joo | G06F 11/3419 |
| 2022/0180178 | A1* | 6/2022 | Tasinga | G06F 9/5011 |
| 2023/0350733 | A1* | 11/2023 | Muthukrishnan | G06F 9/5044 |

\* cited by examiner

| # of Processing Resources | 1 | 2 | 3 | 4 | 5 | 6 | 7 | 8 | 9 | 10 | 11 | 12 |
|---|---|---|---|---|---|---|---|---|---|---|---|---|
| Performance (ms) | 33.07 | 18.92 | 16.07 | 13.12 | 12.47 | 11.69 | 12.51 | 11.31 | 11.51 | 11.22 | 11.91 | 11.88 |

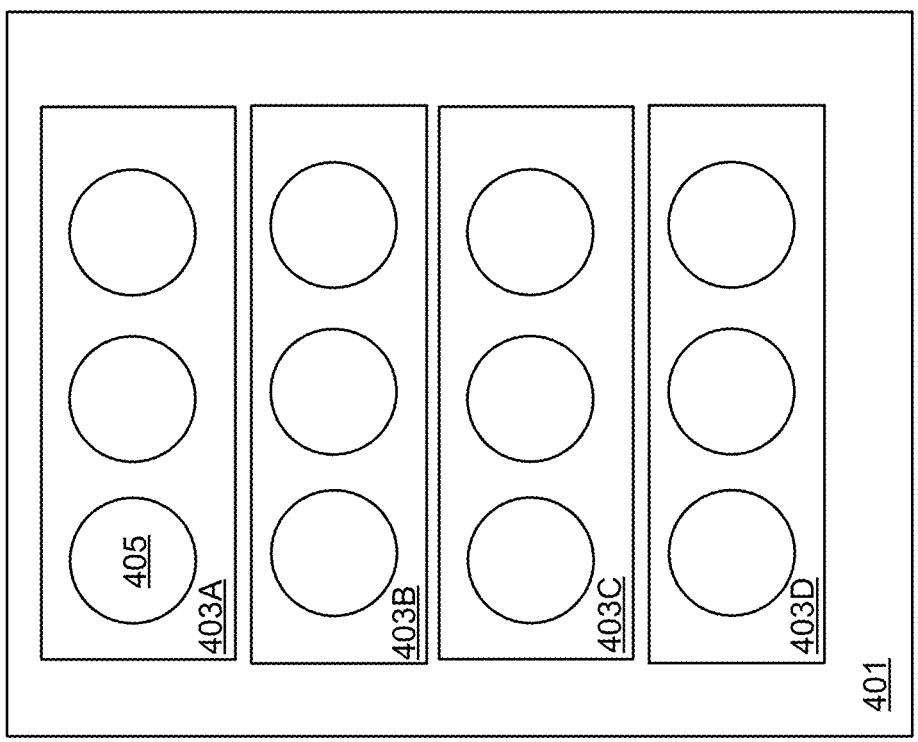

SYSTEM ON CHIP PARALLEL COMPUTING OF ML SERVICES AND APPLICATIONS FOR PARTITIONING RESOURCES BASED ON THE INFERENCE TIMES

CROSS-REFERENCE TO RELATED APPLICATION

This application is a National Stage of International Application No. PCT/CN2022/098126, filed Jun. 10, 2022, which is hereby incorporated by reference in its entirety.

TECHNICAL FIELD

Embodiments of the invention relate generally to scheduling of machine learning (ML) services and models. More particularly, embodiments of the invention relate to parallel computing of ML services and applications.

BACKGROUND

System-on-a-chip (SOC) parallel computing is a type of computation in which many calculations or processes are carried out simultaneously on a single SOC chip. Large problems can often be divided into smaller ones, which can then be solved at the same time with different forms of parallel computing. Parallelism has long been employed in high-performance computing but has gained broader interests due to the physical constraints that prevent frequency scaling for the processing speeds of the single SOC chip.

As power consumption (and consequently heat generation) of computers has become a concern in recent years, parallel computing has become the dominant paradigm in computer architecture, mainly in the form of multi-core processors or multiple computation engines that are included in the SOC.

There is a need to efficiently deploy machine learning tasks or other software tasks on a single silicon to take advantage of the multi-core processors or multiple computation engines of the SOC.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating a grouping of partitions of processing resources according to one embodiment.

DETAILED DESCRIPTION

Figure 1:
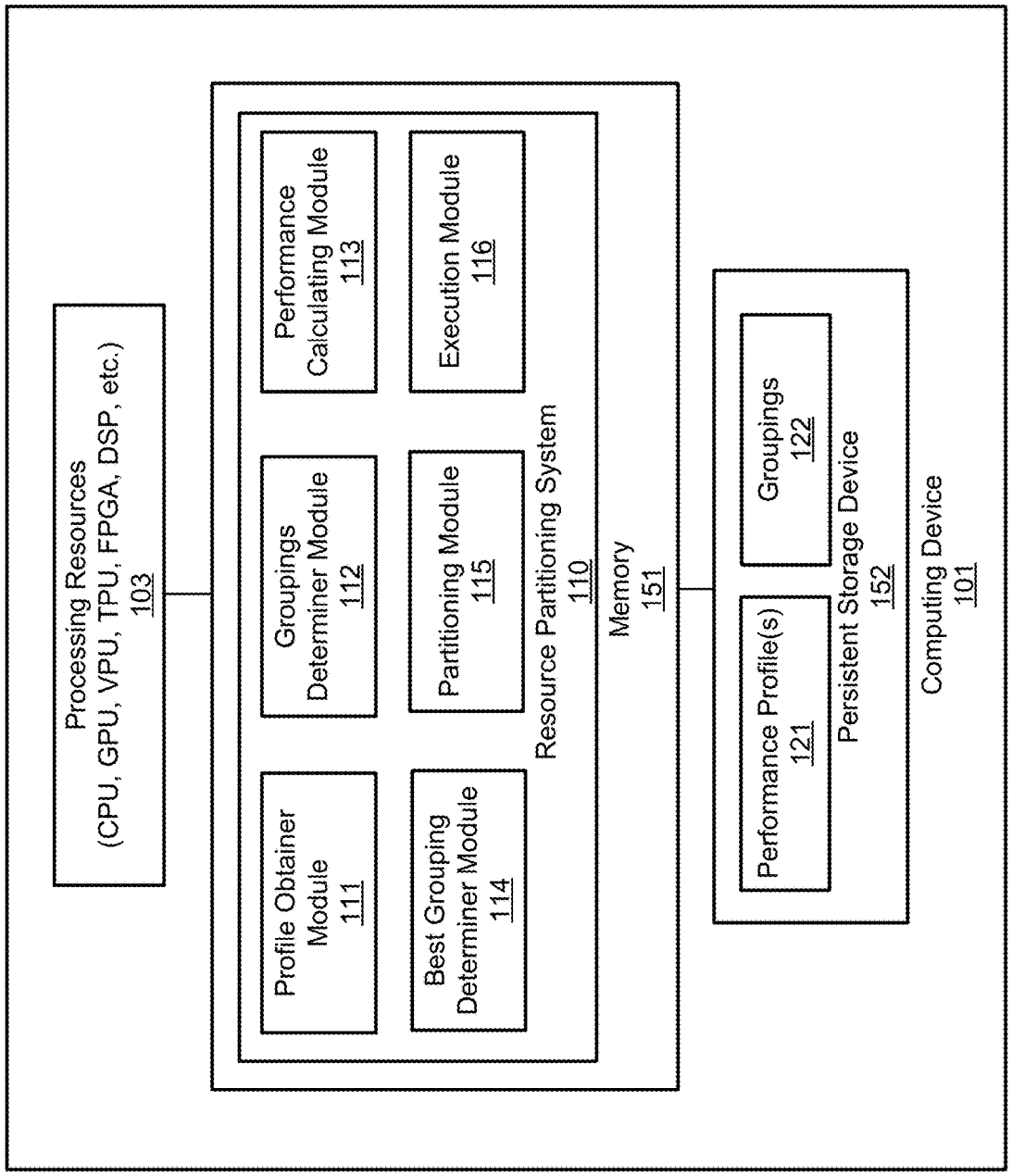
FIG. 1 illustrates an example of a computing device according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments disclose a system to partition processing resources (e.g., processing cores) into one or more partitions to parallelly execute a machine learning (ML) models/services inference, AI-driven applications, and/or other software applications.

From a hardware point of view, a single SOC can include different types and/or numbers of parallel hardware processing resources, e.g., central processing unit (CPU) cores, digital signal processing (DSP) cores, graphical processing unit (GPU) cores, and hardware (HW) ML/artificial intelligence (AI) accelerators that are implemented in a single SOC to support parallel computing. However, an operating system, by default, may not take advantage of the types and/or numbers of parallel hardware processing resources.

Large ML/AI applications are divisible into small subtasks which can be deployed onto different cores (either CPU, GPU, DSP or other HW accelerators). These smaller subtasks can execute in parallel on different cores and their outputs can be merged to provide results for these large ML/AI applications. Embodiments of this application disclose partitioning and distribution of the large ML/AI applications into small subtasks for processing resources to perform the computations in parallel without major rewrite of the software application. The computations results can be merged to provide the final results of the application.

An example of an application is the you-only-look-once (YOLO) real-time object detection ML/AI model executed on a single SOC. The partitioning of the processing resources of a SOC to execute a YOLO ML service as several subtasks is further described with respect to FIGS. 1-5.

According to some embodiments, a system obtains a performance profile corresponding to times taken to perform an inferencing by a machine learning (ML) model using a different number of processing resources of a plurality of processing resources. The system determines one or more groupings of processing resources from the plurality of processing resources, each grouping includes one or more partitions, where each of the partitions is configured with a same number of processing resources for a respective grouping, and each partition is to perform a subtask, where the inferencing includes a plurality of subtasks. The system calculates performance speeds corresponding to each grouping based on the performance profile. The system determines a grouping having a best performance speed from the calculated performance speeds. The system partitions the processing resources into one or more partitions based on the determined grouping to perform the inferencing using the one or more partitions of processing resources.

FIG. 1 illustrates an example of a computing device 101 with an SOC according to one embodiment. Computing device 101 can be a wearable computing devices (e.g., smart watch, glasses, clothes), personal computing devices (e.g., mobile phone, tablet, laptop), home devices (e.g., appliances, thermostats, light systems, security system), advertising devices (e.g., billboards, information kiosks), recording devices (e.g., digital cameras, video cameras, audio recorders), vehicles (e.g., cars, trucks, airplanes), etc. having a SOC or a systems chipset with parallel processing resources. Computing device 101 may include resource partitioning system 110. Resource partitioning system 110 can partition a number of processing resources of device 101 to perform ML/AI services or execute software applications, where the ML/AI service and/or software applications are each divisible into one or more subtasks for parallel processing.

Resource partitioning system 110 may include profile obtainer module 111, groupings determiner module 112, performance calculating module 113, best grouping determiner module 114, partitioning module 115, and execution module 116. Profile obtainer module 111 can obtain performance profiles of corresponding ML services/applications. A performance profile can profile the inference times (or frames per second) to run a ML service/application using different numbers of processing resources of a particular type, in a parallel manner. An example of a performance profile is shown in FIGS. 2A-2B executing YOLO with 1 to 12 DSP cores (e.g., processing resources). The performance profiles can be stored at a remote server or can be stored at performance profiles 121. Profile obtainer module 111 can obtain profiles for different combinations of ML/AI service/applications and/or types of processing resources. Groupings determiner module 112 can determine the possible (enumeration of) groupings from the processing resources that are available at computing device 101. Each grouping can have a different number of partitions, where each partition has a same number of processing resources of a particular type for the respective grouping. The enumeration of groupings can be stored at grouping(s) 122. Performance calculating module 113 can calculate expected performance speeds for the groupings. Best grouping determiner module 114 can determine a best grouping from the enumerated groupings using the expected performance. Partitioning module 115 can partition the processing resources (e.g., CPU cores, GPU cores, DSP cores, HW ML/AI accelerators, etc.) according to the best grouping. Execution module 116 can execute the ML/AI service/application as multiple subtasks using the partitioned processing resources, in a parallel manner.

Note that CPU is a main processor that executes basic instructions of a computer program. GPU is a specialized processor designed to accelerate graphics rendering. VPU is a type of microprocessor aimed at accelerating machine learning and artificial intelligence for tasks like image processing. VPU can take the load off the CPU by assigning tasks to an application-specific co-processor for object, facial recognition and machine earning functions using less heat and power than a GPU. Examples of VPU are Intel® Movidius™ Myriad™. TPU is application-specific integrated circuits (ASICs) used to accelerate machine learning (ML) workloads. FPGA is a semiconductor device that are based on a matrix of configurable logic blocks connected via programmable interconnects. FPGA can be configured for application-specific tasks. DSP is a microprocessor designed to process digital signals. Although the computation engines/cores of the CPU, GPU, VPU, TPU, FPGA, and/or DSP are used as examples for processing resource 103, other types of hardware processing acceleration resources can be used as the processing resources.

Some or all of modules 111-116 may be implemented in software, hardware, or a combination thereof. For example, these modules may be installed in persistent storage device 152, loaded into memory 151, and executed by one or more processing resources (e.g., processors). Note that some or all of these modules may be communicatively coupled to a network. Some of modules 111-115 may be integrated together as an integrated module.

Figure 2:
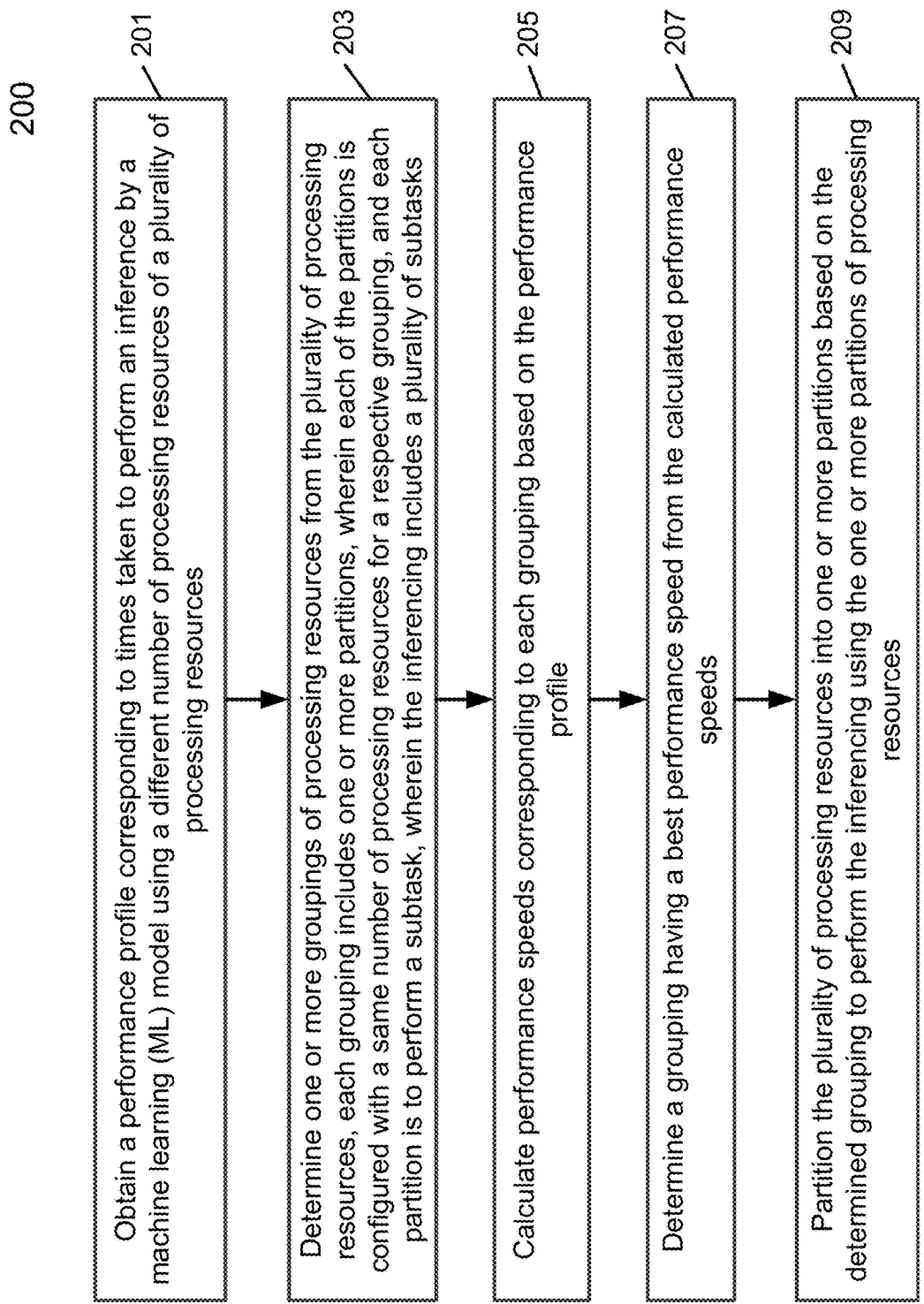
FIG. 2 is a flow diagram illustrating a method according to one embodiment.

FIG. 2 is a flow diagram illustrating a method to partition processing resources according to one embodiment. Process 200 may be performed by processing logic which may include software, hardware, or a combination thereof. For example, process 200 may be performed by a processor of computing system 101 of FIG. 1.

Referring to FIG. 2, at block 201, processing logic obtains a performance profile corresponding to times taken to perform an inference by a machine learning (ML) model using a different number of processing resources of a plurality of processing resources.

A performance profile can profile the performance speeds of a particular software task executed using different numbers and/or types of processing cores/computation engines. The software task can be executed with an instance of a ML/AI inference/training, an application programmable interface (API) service, and/or a large application, where the software task is divisible into smaller subtasks. The performance speed can be expressed in frames per second (FPS), absolute inference time in milliseconds (ms), or other time values, etc. The profile can be generated offline by computing device 101, a remote server, or other devices having performance characteristics similar computing device 101.

In one embodiment, the performance profile can be obtained corresponding to a particular resource type selected by a user. For example, a user can select a resource type or an application defaults to a resource type, and processing logic retrieves a profile corresponding to the resource type.

Figures 3A, 3B:
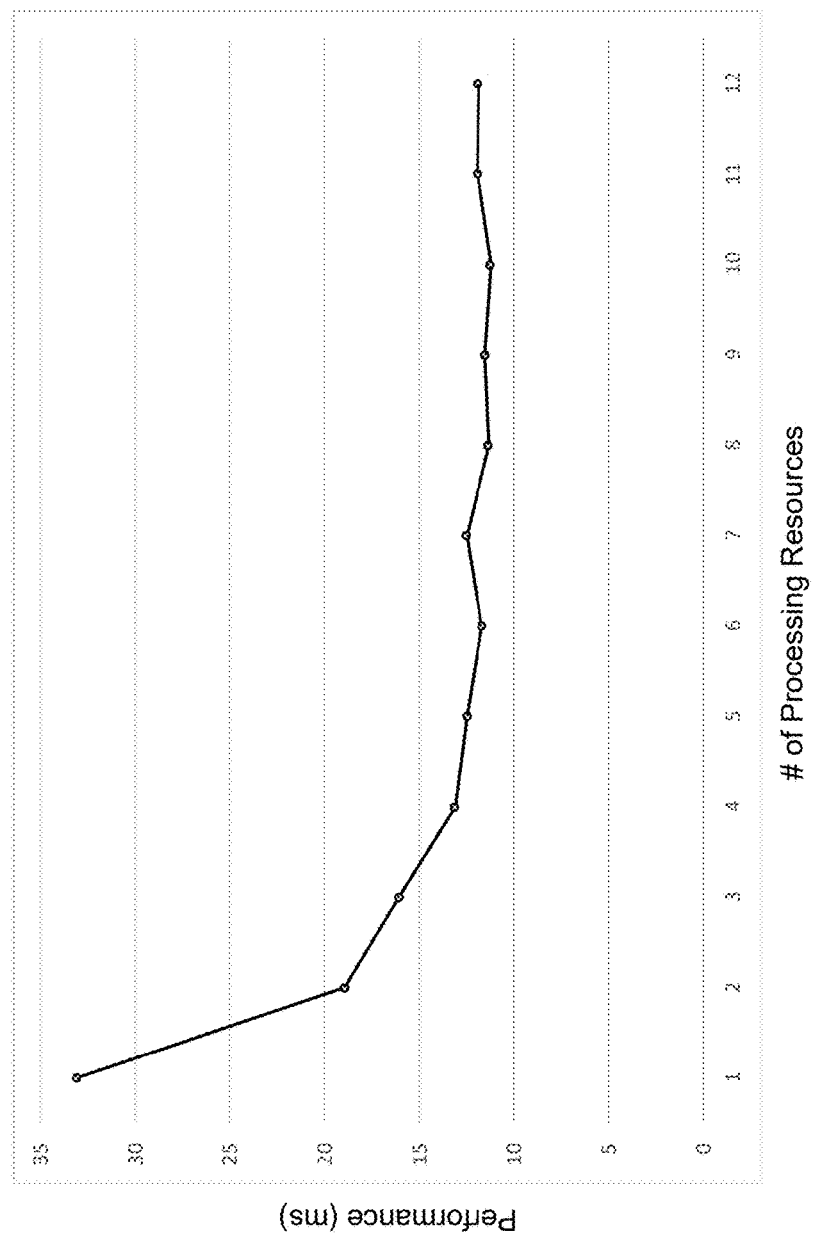
FIG. 3A is an example of a performance profile for a machine learning (ML) service according to one embodiment.
FIG. 3B is a graph of the performance profile of FIG. 3A.

An example of a performance profile is shown in FIG. 3A. FIG. 3A illustrates the performance speeds applying the YOLO ML model to a single image frame using a different number of processing resources (e.g., one DSP core, two DSP cores, . . . twelve DSP cores). Although hardware processing resources are illustrated, the processing resources can be software based computation engines.

Referring to FIG. 3A, the performance speeds are denoted in the milliseconds taken to complete a same inference task with a different number of processing resources. FIG. 3B is a graph of the performance profile of FIG. 3A. As shown, the performance speed tapers toward approximately 11.5 milliseconds for the ML inference task with approximately six cores. Although the example in FIGS. 3A-3B shows a YOLO inference task, the software task can, alternatively, correspond to an application, a simulation, an optimization, regression, a ML/AI training, etc., where the task is assignable to be executed by multi-cores or multiple computation engines or the task is divisible into a plurality of subtasks to be executed in parallel by the multi-cores or multiple computation engines.

At block 203, processing logic determines one or more groupings of processing resources from the plurality of processing resources, each grouping includes one or more partitions, wherein each of the partitions is configured with a same number of processing resources for a respective grouping, and each partition is to perform a subtask, wherein the inferencing includes a plurality of subtasks. In one embodiment, the groupings have resource types corresponding to a type indicated by the performance profile.

For example, if the computing device has a SOC that includes 12 DSP cores for ML/AI processing, the number of DSP cores is determined to be the available processing resources, e.g., 12. Then, the possible groupings of the 12 DSP cores are the combinations of possible partitions from the available cores, where each partition have a same number of cores. In one embodiment, the combination is where the total number of cores are divisible into a whole number. For example, the groupings can be partitions of: 12 div 1, 12 div 2, 12 div 3, 12 div 4, and 12 div 6. Here, 12 div 5 does not produce a whole number and so the 5-cores combination is disregarded. Thus, the possible enumeration of groupings are: 6+6, 4+4+4, 3+3+3+3, 2+2+2+2+2+2, and 1+1+1+1+1+1+1+1+1+1+1+1. Here, the grouping of 6-6 include two partitions, each partition has a same number of 6 cores. The grouping of 4+4+4 includes three partitions, each partition has 4 cores. The grouping of 3+3+3+3 includes four partitions, each partition has 3 cores. The grouping of 2+2+2+2+2+2 includes six partitions, each partition has 2 cores. The grouping of 1+1+1+1+1+1+1+1+1+1+1+1 includes 12 partitions, each partition has 1 core. In other embodiments, the combination of possible groupings are not limited to evenly distributed cores. For example, 12 cores can be divided into two partitions of 5 cores each (e.g., 5-5), and 2 left over cores are configured to be idle and not used for the software task.

At block 205, processing logic calculates the performance speeds corresponding to each grouping based on the performance profile.

For example, for the 6+6 grouping, there are two subtasks, each executes at 11.69 ms according to the inference time corresponding to 6 cores shown in FIG. 3A. The computed performance speed is then 11.69/2=5.85 ms for the two subtasks. The communication overhead for the 6+6 grouping having the two partitions is one unit of input/output (I/O) communication latency (1 comm), where the one communication latency is used to merge the results of the two partitions. Thus, the total performance speed is 5.85 ms+1 comm. The one communication latency is typically associated with writing the computation results to the memory cache buffer and merging the results to generate the inference output. In some embodiment, the communication latency is in the milliseconds or the sub-milliseconds.

For another example, for the 4+4+4 grouping, there are three subtasks, each executes at 13.12 ms according to the inference time corresponding to 4 cores shown in FIG. 3A. The computed performance speed is then 13.12/3=4.37 ms for the three subtasks. The communication overhead for the 4+4+4 grouping having the three partitions is two units of I/O communication latency (2 comm), where a first communication merges the results of two partitions and a second communication merges the results of the third partition with the merged results. Thus, the total performance speed is 4.37 ms+2 comm.

For another example, for the 3+3+3+3 grouping, there are four subtasks, each executes at 16.07 ms according to the inference time corresponding to 3 cores shown in FIG. 3A. The computed performance speed is then 16.07/4=4.02 ms for the four subtasks. The communication overhead for the 3+3+3+3 grouping having the four partitions is three units of I/O communication latency (3 comm), where a first communication merges the results of first two partitions, a second communication merges the results of the third partition with the merged results, and a third communication merges the results of the fourth partition with the merged results. Thus, the total performance speed is 4.02 ms+3 comm.

For another example, for the 2+2+2+2+2+2 grouping combination, there are six subtasks, each executes at 18.92 ms according to the inference time corresponding to the 2 cores shown in FIG. 3A. The computed performance speed is then 18.92/6=3.15 ms for the six subtasks. The communication overhead for the 2+2+2+2+2+2 grouping having the fix partitions is five units of I/O communication latency (5 comm), where a first communication merges the results of first two partitions, a second communication merges the results of the third partition with the merged results, a third communication merges the results of the fourth partition with the merged results, a fourth communication merges the results of the fifth partition with the merged results, and a fifth communication merges the results of the sixth partition with the merged results. Thus, the total performance speed is 3.15 ms+5 comm.

As discussed above, a software task when divisible into sub-tasks and are executed with partitions of processing cores can achieve better performance than a baseline approach, where the baseline approach executes the software task as a single unit using the multiple processing cores. The following paragraphs describes an approach to select an optimal/best partitioning while minimizing the communication latency and/or cache memory overhead.

At block 207, processing logic determines a grouping having a best performance speed from the calculated performance speeds.

For example, depending on the value for a unit of communication latency, the best performance speed can be selected from the calculated total performance speeds for the different groupings determined at block 205. For example, if 4.02 ms+3 comm<5.85 ms+1 comm<4.37 ms+2 comm<3.15 ms+5 comm, then the 3+3+3+3 grouping has the better performance than the 4+4+4 and 2+2+2+2+2+2 groupings and the 3+3+3+3 grouping is selected for partitioning.

Figure 5:
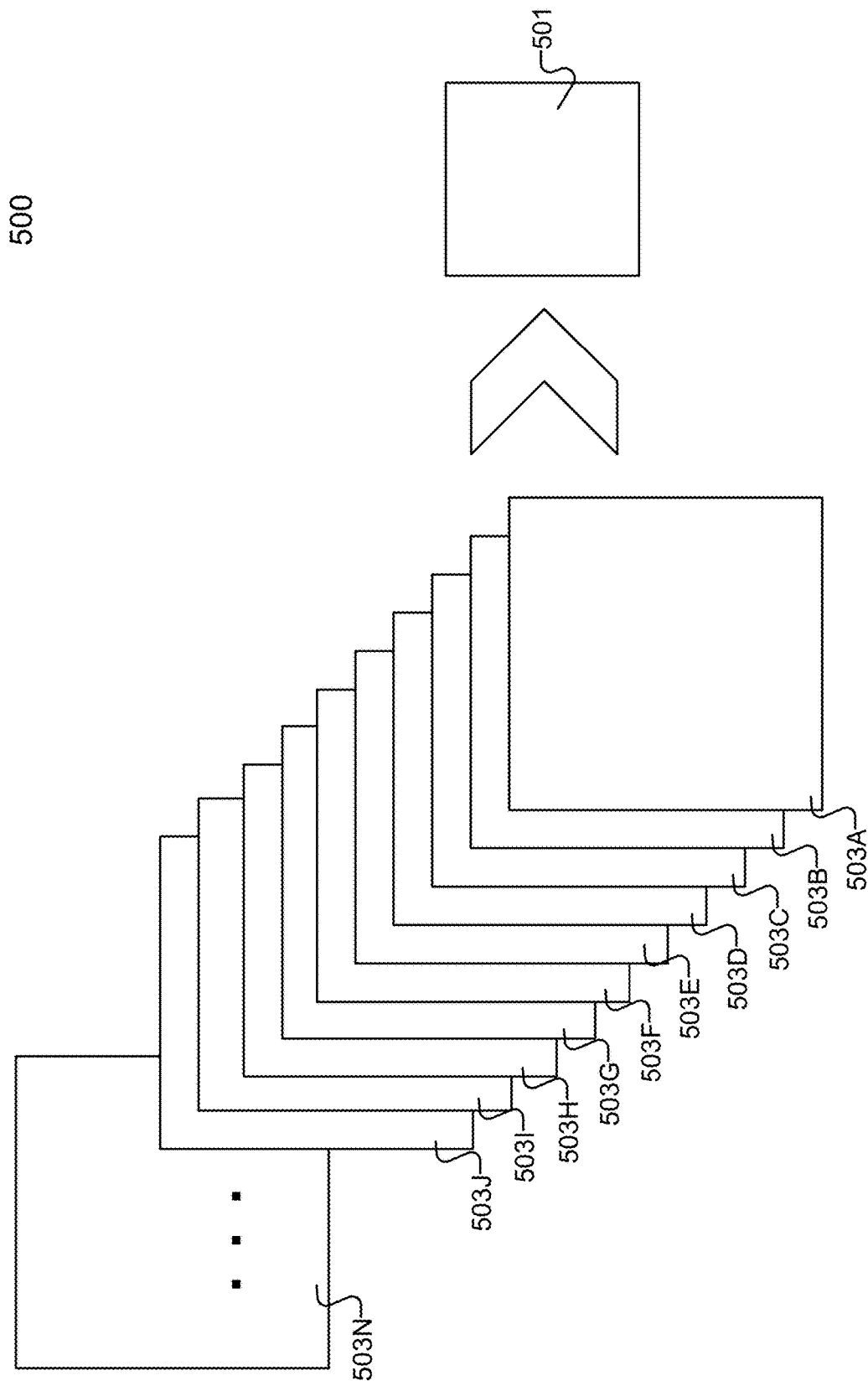
FIG. 5 illustrates examples of an inference task for a ML service according to one embodiment.

An example of the grouping with the 3+3+3+3 partitions is shown in FIG. 4. As shown in FIG. 4, grouping 401 includes four partitions 403A-403D. Each of the partitions 403A-403D include three processing cores 405. When a software task is executed by processing resources configured as the 3+3+3+3 grouping, each partition executes a subtask of the software task in a parallel manner, where the software task is divisible into a plurality of subtasks. An example of a ML inference divided into subtasks is shown in FIG. 5.

In one embodiment, determining the grouping having the best performance speed from the determined performance speeds includes determining that a timing latency used to communicate data among each partition of processing resources in the grouping is within a threshold.

For example, a use case can be preconfigured to limit the I/O communication latency to 3 comm or less. In this case, the qualifying groupings are 6+6, 4+4+4, and 3+3+3+3. Then, a best grouping is selected from these groupings. In one embodiment, if the 3+3+3+3 grouping combination has a best performance speed, e.g., 4.02 ms+3 comm is less than 4.37 ms+2 comm and 5.85 ms+1 comm, the 3+3+3+3 grouping is selected as the best grouping.

In one embodiment, determining the grouping having the best performance speed from the determined performance speeds includes determining memory buffer used for communication among each partition of processing resources in the grouping is within a threshold using a calculation method or a trial and error method.

In one embodiment, the determining the memory buffer used for the communication among each partition of processing resources in the grouping is within the threshold includes determining an inference time executing the ML model is within a threshold of the calculated performance speed for the grouping.

For example, as a trial and error method, ML model can be executed using the enumerated groupings in an ordering (e.g., 2 partitions, 3 partitions, 4 partitions, and so forth). The groupings with actual execution/inference times that are within a threshold (e.g., within 10%) of the calculated performance (calculated in block 205) are determined to have memory buffer allocations to be within the threshold. Here, groupings with memory buffer allocations above the available capacity would be indicative of a worst performance. E.g., processing logic would have instantiated and deleted I/O communication buffers in order to free memory capacity for subsequent I/O communication buffers leading to a degradation in performance from the additional processing and/or time latency in instantiating/deleting the memory buffers.

In one embodiment, the determining the memory buffer used for the communication among each partition of processing resources in the grouping is within the threshold includes calculating input/output memory buffers requirements for each partition to communicate with the rest of partitions in the grouping, summing the total input/output memory buffers requirements of all partitions in the grouping, and determining the total input/output memory buffers requirements is below an available memory capacity for the processing resources.

In one embodiment, the threshold is determined to be the cache memory available at the chipset/SOC. In one embodiment, the memory requirement is $O(n^2-n)$, where n is the number of partitions of processing resources.

The Intel Movidius chipset can be used as an example to determine the memory buffer capacity. For example, processing logic can determine the threshold to be 2 megabytes for an Intel Movidus with a SOC chipset having 2 megabytes (MB) of cache memory accessible by the 12 DSP processing cores (e.g., processing resources) and/or the CPU cores. The DSP cores can be used for the parallel subtasks and the CPU can monitor and merge the final computation results from the parallel subtasks.

In some embodiments, for the 6+6 grouping of two partitions, each partition has a set of I/O buffers that is at least the size of the intermediate results. If the intermediate result requires 100 KB buffer size, the memory requirement is approximately $(n^2-n) \times 100$ kB=200 kB for the I/O communication for the two partitions. That is, there is a 200 kB of I/O buffers for communication of the results between Partition 1 and Partition 2.

For the 4+4+4 grouping of three partitions, the cache memory requirement is $(3^2-3) \times 100$ kB=600 kB for the I/O communication among the three partitions. E.g., Partition 1 uses 200 kB for I/O communication with Partition 2. Partition 2 uses 200 kB for I/O communication with Partition 3. Partition 3 uses 200 kB for I/O communication with Partition 1, which provides a total of 600 kB memory utilization.

For the 3+3+3+3 grouping of four partitions, the cache memory requirement is $(4^2-4) \times 100$ kB=1200 kB for the I/O communication among the three partitions. E.g., Partition 1 uses 200 kB for I/O communication with Partition 2. Partition 1 uses 200 kB for I/O communication with Partition 3. Partition 1 uses 200 kB for I/O communication with Partition 4. Partition 2 uses 200 kB for I/O communication with Partition 3. Partition 2 uses 200 kB for I/O communication with Partition 4. Partition 3 uses 200 kB for I/O communication with Partition 4. The I/O communication buffers for the four partitions require a total of 1200 kB in memory utilization.

For the 2+2+2+2+2+2 grouping of six partitions, the cache memory requirement is $(6^2-6) \times 100$ kB=3000 KB for the I/O communication among the six partitions. E.g., Partition 1 uses 200 kB for I/O communication with Partition 2. Partition 1 uses 200 kB for I/O communication with Partition 3. Partition 1 uses 200 kB for I/O communication with Partition 4. Partition 1 uses 200 kB for I/O communication with Partition 5. Partition 1 uses 200 kB for I/O communication with Partition 6. Partition 2 uses 200 kB for I/O communication with Partition 3. Partition 2 uses 200 kB for I/O communication with Partition 4. Partition 2 uses 200 kB for I/O communication with Partition 5. Partition 2 uses 200 kB for I/O communication with Partition 6. Partition 3 uses 200 kB for I/O communication with Partition 4. Partition 3 uses 200 kB for I/O communication with Partition 5. Partition 3 uses 200 kB for I/O communication with Partition 6. Partition 4 uses 200 kB for I/O communication with Partition 5. Partition 4 uses 200 kB for I/O communication with Partition 6. Partition 5 uses 200 kB for I/O communication with Partition 6. The I/O communication buffers for the six partitions require 3000 KB in memory utilization.

As discussed above, if the memory threshold is determined to be two megabytes, the groupings is selected from 6+6, 4+4+4, and 3+3+3+3, since these groupings have memory utilization for I/O communication less than the threshold of 2 megabytes. The groupings of 2+2+2+2+2+2 and 1+1+1+1+1+1+1+1+1+1+1+1 are disregarded because their memory utilization is more than the threshold of 2 megabytes.

At block 209, processing logic partitions the plurality of processing resources into one or more partitions based on the determined grouping to perform the inferencing using the one or more partitions of processing resources.

In one embodiment, processing logic further applies the ML model to the plurality of subtasks to perform the inferencing, each subtask is executed by a partition of processing resources in a parallel manner.

In one embodiment, at compile and/or link time of the ML model, a command can be executed to configure how many partitions of how many cores from the available processing cores/computation engines to use to execute the ML model. In another embodiment, the chipset provider can provide an application programming interface (API) to a user, and the user can call the API to configure the partitions of cores to execute the ML model at runtime. For example, if the 3+3+3+3 grouping is determined as the best grouping, processing logic executes an API to run the ML model as four partitions, each partition having 3 cores. Processing logic then applies the ML model to the plurality of subtasks to perform the inferencing, each subtask executed by a partition in a parallel manner.

FIG. 5 is an example 500 of real-time image recognition using the YOLO ML model. As shown, a stream of real-time images 503A-503J . . . 503N are provided to YOLO ML model 501. Here, when a user calls an API to run the ML model as grouping 3+3+3+3, processing logic divides the DSP cores into four partitions of three cores each. Here, the real-time image recognition can have a video stream input with 60 image frames per seconds and inferencing of each of the image frames can be a subtask and the subtask can be executed by a particular partition.

In one embodiment, the different partitions of resources apply the ML model to the image frames in the video stream in a round robin manner. In another embodiment, the partitions apply the ML model to the video stream in a first-come-first-served manner. Referring to FIGS. 4-5, for the round robin example, frame 503A can be executed by partition 403A, frame 503B can be executed by partition 403B, frame 503C can be executed by partition 403C, and frame 503D can be executed by partition 403D of FIG. 4. In the next round, frame 503E can be executed by partition 403A, frame 503F can be executed by partition 403B, frame 503G can be executed by partition 403C, and frame 503H can be executed by partition 403D, and so forth. In the first-come-first-served manner, any available partitions can be used to execute an image frame so long the partitions are available.

Although an inference task using the YOLO ML model is used as the example, the disclosed resource partitioning method/system can be used for other software tasks and/or ML models or algorithms. Examples of software tasks include ML model batch training (each batch can be executed as a subtask and the results from the batches can be combined), optimization, regression, database and software applications, etc. Examples of ML models/algorithms include deep/very deep convolutional neural networks (CNN), such as Inception-v4 and ResNet-50, long short term memory (LSTMs), reinforcement models, support vector machine (SVM), k-nearest neighbor (kNN), regression, random forest, decision tree, naïve bayes, k-means, etc. The subtasks and/or ML models can be chained, where a subtask and/or ML model require inputs from (or invoke) additional subtasks and/or ML models. Each ML model can include dozens or hundreds of inner layers.

Figure 6:
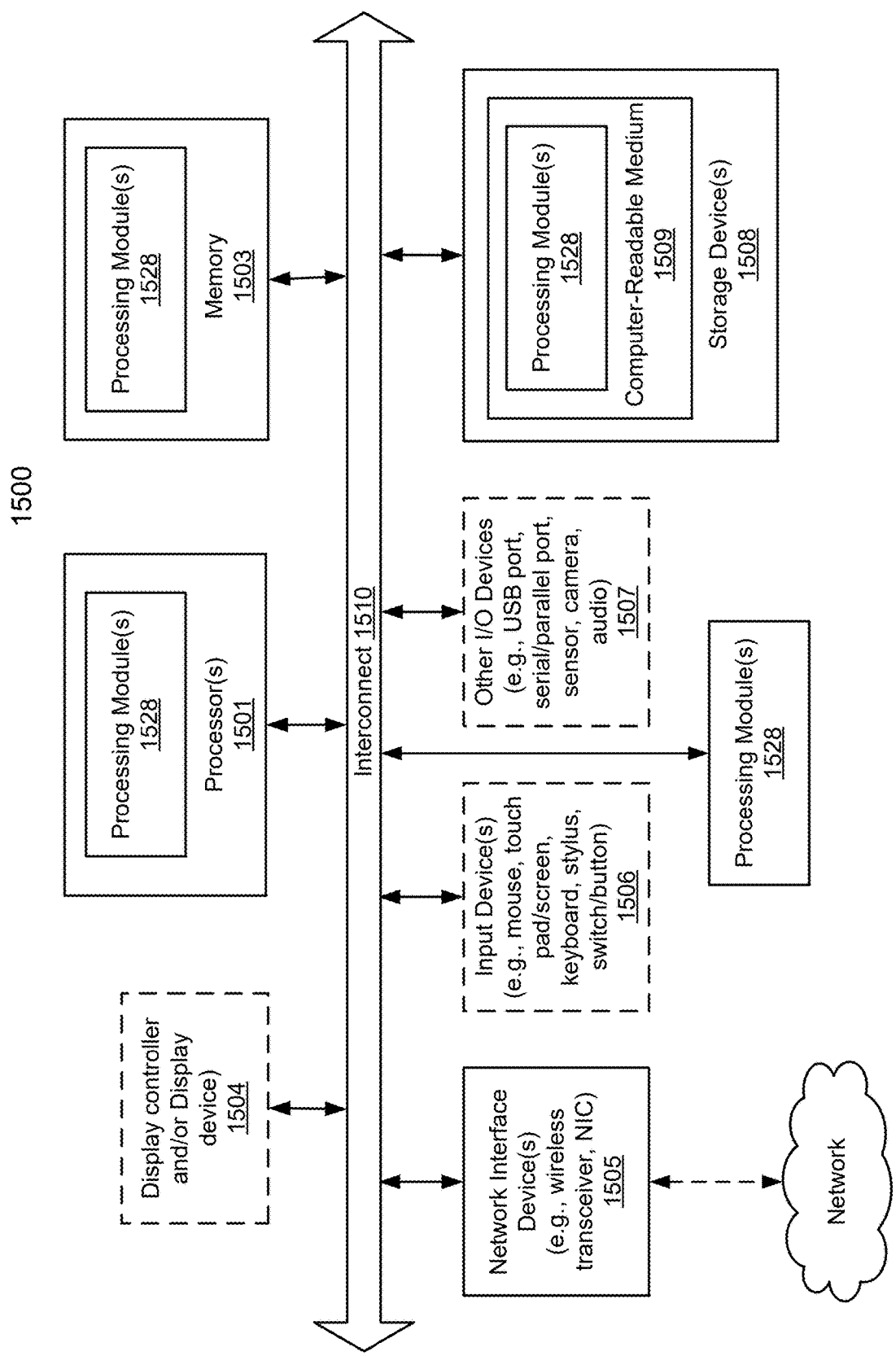
FIG. 6 is a block diagram illustrating a data processing system according to one embodiment.

FIG. 6 is a block diagram illustrating a data processing system according to one embodiment. For example, system 1500 may represent computing device 101 of FIG. 1.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, resource partitioning system 110 as described in FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store at least some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to partition processing resources, comprising:
 obtaining a performance profile comprising information on different numbers of processing resources and inference times corresponding to the different numbers of processing resources, each inference time is an amount of time taken to perform an inferencing by a machine learning (ML) model using a corresponding number of processing resources from the different numbers of processing resources;
 determining one or more groupings of processing resources from a plurality of processing resources, each grouping of processing resources includes one or more partitions;
 determining a performance speed corresponding to each grouping of processing resources based on the performance profile, wherein the performance speed is an amount of time taken by a partition of the grouping of processing resources to perform a subtask of the inferencing;
 determining a grouping of processing resources, from the one or more groupings of processing resources, having a best performance speed from determined performance speeds corresponding to the one or more groupings of processing resources;
 partitioning the plurality of processing resources based on the determined grouping to perform the inferencing; and
 performing the inferencing using the partitioned processing resources;
 wherein:
 determining the grouping of processing resources having the best performance speed from the determined performance speeds comprises determining memory buffers used for communication among each partition of processing resources in the grouping is within a threshold;
 determining the memory buffers used for the communication among each partition of processing resources in the grouping is within the threshold comprises:
 determining an inference time executing the ML model is within a threshold of a determined performance speed for the grouping; or
 calculating input/output memory buffers requirements for each partition to communicate with the rest of partitions in the grouping, summing a total input/output memory buffer requirement of all partitions in the grouping, and determining whether the total input/output memory buffer requirement is below an available memory capacity for the processing resources.

2. The method of claim 1, wherein each of the one or more partitions is configured with a same number of processing resources for a respective grouping, wherein the inferencing includes a plurality of subtasks and each partition is to perform a subtask.

3. The method of claim 2, further comprising: applying the ML model to the plurality of subtasks to perform the inferencing, each subtask is executed by a partition of processing resources in a parallel manner.

4. The method of claim 1, wherein determining the grouping of processing resources, from the one or more groupings of processing resources, having the best performance speed from the determined performance speeds comprises determining a timing latency used to communicate data among each partition of processing resources in the grouping.

5. The method of claim 1, wherein the plurality of processing resources includes a plurality of processing cores of a processing unit of a computing device, wherein an available memory capacity of the processing resources is a cache memory used by the processing unit.

6. A data processing system, comprising:
 a processor; and
 a memory coupled to the processor to store instructions, which when executed by the processor, cause the processor to perform operations, the operations including:
 obtaining a performance profile comprising information on different numbers of processing resources and inference times corresponding to the different numbers of processing resources, each inference time is an amount of time taken to perform an inferencing by a machine learning (ML) model using a corresponding number of processing resources from the different numbers of processing resources;
 determining one or more groupings of processing resources from a plurality of processing resources, each grouping of processing resources includes one or more partitions;
 determining a performance speed corresponding to each grouping of processing resources based on the performance profile, wherein the performance speed is an amount of time taken by a partition of the grouping of processing resources to perform a subtask of the inferencing;
 determining a grouping of processing resources, from the one or more groupings of processing resources, having a best performance speed from determined performance speeds corresponding to the one or more groupings of processing resources;
 partitioning the plurality of processing resources based on the determined grouping to perform the inferencing; and
 performing the inferencing using the partitioned processing resources;
 wherein:
 determining the grouping of processing resources having the best performance speed from the determined performance speeds comprises determining memory buffers used for communication among each partition of processing resources in the grouping is within a threshold;
 determining the memory buffers used for the communication among each partition of processing resources in the grouping is within the threshold comprises:
 determining an inference time executing the ML model is within a threshold of a determined performance speed for the grouping; or
 calculating input/output memory buffers requirements for each partition to communicate with the rest of partitions in the grouping, summing a total input/output memory buffer requirement of all partitions in the grouping, and determining whether the total input/output memory buffer requirement is below an available memory capacity for the processing resources.

7. The data processing system of claim 6, wherein each of the one or more partitions is configured with a same number of processing resources for a respective grouping, wherein the inferencing includes a plurality of subtasks and each partition is to perform a subtask.

8. The data processing system of claim 7, wherein the operations further comprise applying the ML model to the plurality of subtasks to perform the inferencing, each subtask is executed by a partition of processing resources in a parallel manner.

9. The data processing system of claim 6, wherein determining the grouping of processing resources, from the one or more groupings of processing resources, having the best performance speed from the determined performance speeds comprises determining a timing latency used to communicate data among each partition of processing resources in the grouping.

10. The data processing system of claim 6, wherein the plurality of processing resources includes a plurality of processing cores of a processing unit of a computing device, wherein an available memory capacity of the processing resources is a cache memory used by the processing unit.

11. A non-transitory machine-readable medium having instructions stored therein, which when executed by a processor, cause the processor to perform operations, the operations comprising:
   obtaining a performance profile comprising information on different numbers of processing resources and inference times corresponding to the different numbers of processing resources, each inference time is an amount of time taken to perform an inferencing by a machine learning (ML) model using a corresponding number of processing resources from the different numbers of processing resources;
   determining one or more groupings of processing resources from a plurality of processing resources, each grouping of processing resources includes one or more partitions;
   determining a performance speed corresponding to each grouping of processing resources based on the performance profile, wherein the performance speed is an amount of time taken by a partition of the grouping of processing resources to perform a subtask of the inferencing;
   determining a grouping of processing resources, from the one or more groupings of processing resources, having a best performance speed from determined performance speeds corresponding to the one or more groupings of processing resources;
   partitioning the plurality of processing resources based on the determined grouping to perform the inferencing; and
   performing the inferencing using the partitioned processing resources;
   wherein:
   determining the grouping of processing resources having the best performance speed from the determined performance speeds comprises determining memory buffers used for communication among each partition of processing resources in the grouping is within a threshold;
   determining the memory buffers used for the communication among each partition of processing resources in the grouping is within the threshold comprises:
      determining an inference time executing the ML model is within a threshold of a determined performance speed for the grouping; or
      calculating input/output memory buffers requirements for each partition to communicate with the rest of partitions in the grouping, summing a total input/output memory buffer requirement of all partitions in the grouping, and determining whether the total input/output memory buffer requirement is below an available memory capacity for the processing resources.

12. The non-transitory machine-readable medium of claim 11, wherein each of the one or more partitions is configured with a same number of processing resources for a respective grouping, wherein the inferencing includes a plurality of subtasks and each partition is to perform a subtask.

13. The non-transitory machine-readable medium of claim 12, wherein the operations further comprise applying the ML model to the plurality of subtasks to perform the inferencing, each subtask is executed by a partition of processing resources in a parallel manner.

14. The non-transitory machine-readable medium of claim 11, wherein determining the grouping of processing resources, from the one or more groupings of processing resources, having the best performance speed from the determined performance speeds comprises determining a timing latency used to communicate data among each partition of processing resources in the grouping.

* * * * *